United States Patent [19]

Lyon

[11] 4,391,546
[45] Jul. 5, 1983

[54] SCREW FIXING

[75] Inventor: Robert C. Lyon, Greater Manchester, England

[73] Assignee: BICC Public Limited Company, London, England

[21] Appl. No.: 223,004

[22] Filed: Jan. 6, 1981

[51] Int. Cl.³ .......................... F16B 7/08; F16L 41/00
[52] U.S. Cl. .................................... 403/189; 411/104
[58] Field of Search ........................ 411/84, 85, 87, 88, 411/90, 91, 92, 98, 101, 104, 129, 132, 184, 187; 403/105, 189

[56] References Cited

U.S. PATENT DOCUMENTS

| 2,345,650 | 4/1944 | Attwood | 403/189 UX |
| 2,380,379 | 7/1945 | Attwood | 411/112 X |
| 2,767,951 | 10/1956 | Cousino | 411/166 X |
| 4,285,379 | 8/1981 | Kowalski | 411/85 |

FOREIGN PATENT DOCUMENTS 782428  9/1957  United Kingdom ................ 411/112

Primary Examiner—W. L. Shedd
Attorney, Agent, or Firm—Buell, Blenko, Ziesenheim & Beck

[57] ABSTRACT

A screw fixing comprising a screw (9) having a nut (1) threaded on it, the screw head and the nut each having a bearing surface facing the other, and a channel (5) having at the free ends of the limbs of the channel inturned flanges (6) directed towards the base (8) of the channel, the flanges defining a slot (10) which is open at both ends, at least one of the flanges having teeth (7) in its free edge directed towards the base of the channel and the bearing surface that engages it having parallel ribs (4) that interlock with the teeth to prevent the screw and nut sliding longitudinally in the channel.

6 Claims, 7 Drawing Figures

SCREW FIXING

This invention relates to screw fixings of the kind in which a screw (or threaded bolt) screws into a female threaded member (a nut) that is distinct from the major members fixed together thereby, and which is capable of being adjusted along the length of a slot in one of the major members.

One important instance is in the fixing of brackets or other fittings to channels of the kind (for example that sold by the Applicants through their subsidiary BICC Components Ltd. under the Trade Mark "Leprack" as Leprack channel) having inturned flanges at the free ends of the limbs of the channel, to which fixings are commonly made by using a rectangular nut (usually with two rounded corners) that can be passed through the open slot between the inturned flanges and then rotated through 90° to engage behind those flanges, the screw and the nut then being tightened.

This arrangement has the disadvantage that when the screw and nut are being tightened and sometimes after it is tightened and under load, the screw and nut may slide longitudinally in the channel.

In accordance with the present invention, a screw fixing comprises a screw having a nut threaded on it, the screw head and the nut each having a bearing surface facing the other, and a channel having at the free ends of the limbs of the channel inturned flanges directed towards the base of the channel, the flanges defining a slot which is open at both ends, at least one of the flanges having teeth in its free edge directed towards the base of the channel, and the bearing surface that engages it having parallel ribs that interlock with the teeth to prevent the screw and nut sliding longitudinally in the channel.

The teeth in the flange are preferably perpendicular to the major axis of the slot, although they may be set at a small angle thereto. Further, when there are teeth on both edges of the slot, the ribs may sometimes be engageable with alternative teeth on one edge for each position of engagement on the other, so providing firm engagement in several angular positions of the nut or screw head.

The pitch of the ribs is preferably the same as the pitch of the teeth. Alternatively the pitch of the ribs may be double that of the teeth, or another small multiple thereof.

Where the bearing surface having parallel ribs is on the nut, the ribs may be formed by any suitable method, for example the nut may be forged or stamped, in which case the ribs preferably extend only part way across the bearing surface. Alternatively the ribs may be formed as a section from which the nut is to be formed is rolled or extruded, before the ends of the nut are machined and a hole is drilled and tapped; in this case the ribs will normally extend longitudinally right across the surface.

Preferably, the nut or screw head, as the case may be, is non-circular (for example it may be of the usual basically rectangular shape with two opposite corners rounded or otherwise relieved) so that it can be passed through the slot and rotated to engage the inturned flanges of the channel; in this case the ribs will extend at least approximately parallel to the major dimension of the nut or screw head (as the longer side of the rectangle).

The invention also includes a method of making a screw fixing comprising presenting to a channel having at the free ends of the limbs of the channel inturned flanges directed towards the base of the channel, the flanges defining a slot which is open at both ends, a device comprising a screw having a nut threaded on it, the screw head or the nut constituting a non-circular abutment member, passing the abutment member through the slot, rotating the screw and the nut together until the abutment member engages the inturned flanges of the channel, the abutment member having parallel ribs and at least one of the inturned flanges, having teeth in its free edge directed towards the base of the channel which can interengage, and then rotating the screw relative to the nut to screw the nut towards the screw head, the ribs and teeth interlocking to prevent the screw and nut sliding longitudinally in the channel.

In most cases the sides of the slot will be parallel, but this is not essential.

Preferably the device comprises a fitting having a screw passing (and preferably pre-inserted) through a clearance hole therein and having a nut threaded on it. In this case the clearance hole preferably has a diameter equal to or slightly greater than the sum of the screw diameter and the pitch of the teeth. This allows the fitting to be located longitudinally of the slot in any required position relative to the major member despite the finite size of the ribs and teeth.

Preferably the screw and the nut are engaged by means which offer resistance to but do not prevent, screwing of the nut towards the screw head, preferably as described in our publication no. 804.

The teeth on the inturned flanges can be formed in any convenient manner but preferably they are formed by knurling, punching or otherwise shaping the edge of the channel preform (or at least one of them) before the preform is folded into the shape of the channel. Preferably this operation is carried out in-line with the folding of the preform, or it could be done during slitting of metal to form the flat preform.

The invention is now described with reference to and as shown in the accompanying drawings in which.

Figure 1:
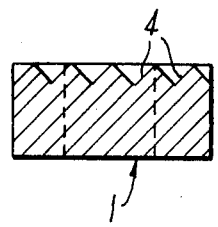
FIG. 1 is a cross-section through the line I—I in FIG. 2 of a nut for use in one aspect of the invention.
Figure 2:
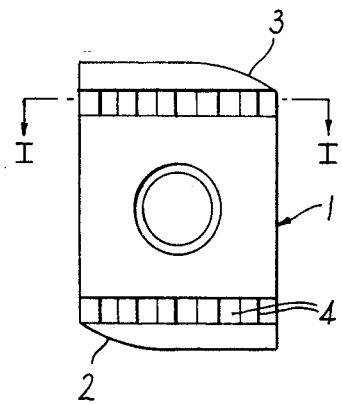
FIGS. 2 and 3 are top and perspective views respectively of the nut.
Figure 3:
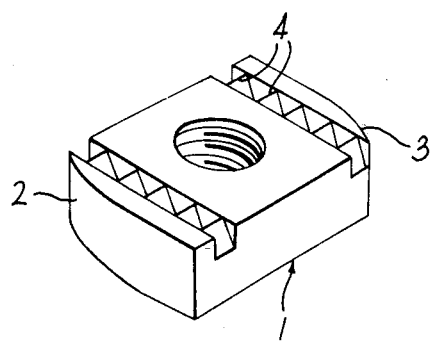

The nut 1 shown in FIGS. 1 to 3 has an approximately rectangular shape with two of the opposite corners 2 and 3 rounded. Ribs 4 have been formed on one surface of the nut 1 in stamping of the nut. The apex of each rib has an approximate angle of 90°, and the ribs have a pitch of approximately 2 mm.

Figure 4:
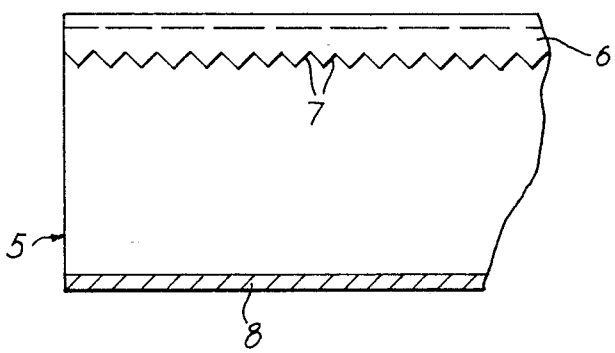
FIGS. 4 and 5 are part sectional views of a channel.
Figure 5:
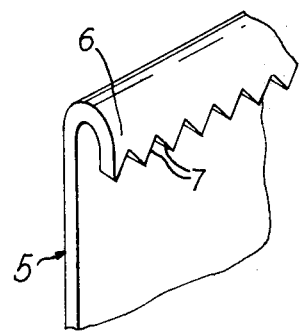

The channel 5 shown in FIGS. 4 and 5 has inturned flanges 6 at the free ends of the limbs of the channel directed towards the base 8 of the channel, each flange having teeth 7 formed in its free edge. The teeth 7 are perpendicular to the face of the flange 6, are directed towards the base 8 of the channel 5, and are complementary in shape and size to the ribs on the nut.

Figure 6:
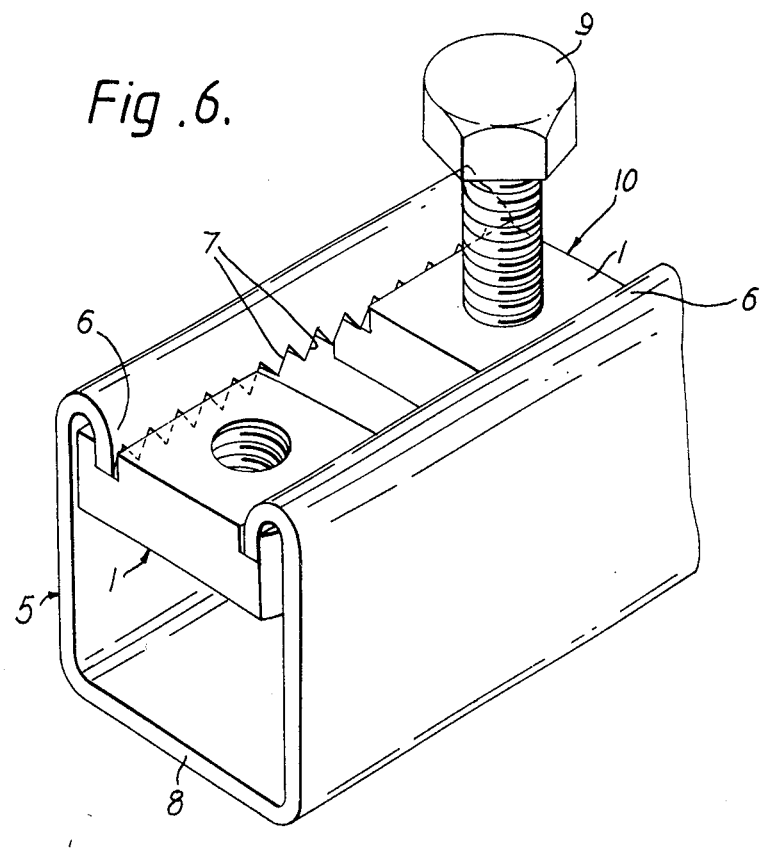
FIG. 6 is a view of this aspect of the invention.

FIG. 6 shows the position of two nuts 1, one of which has a screw 9 threaded to it, in the channel 5, with the ribs 4 interengaging with the grooves 7 on the flanges 6 of the channel. The flanges 6 define a slot 10, which is open at both ends, in the channel 5. The nuts 1 may be provided with a biassing spring positioned between each nut and the base 8 of the channel to urge the nut towards the inturned flanges 6 of the channel.

Figure 7:
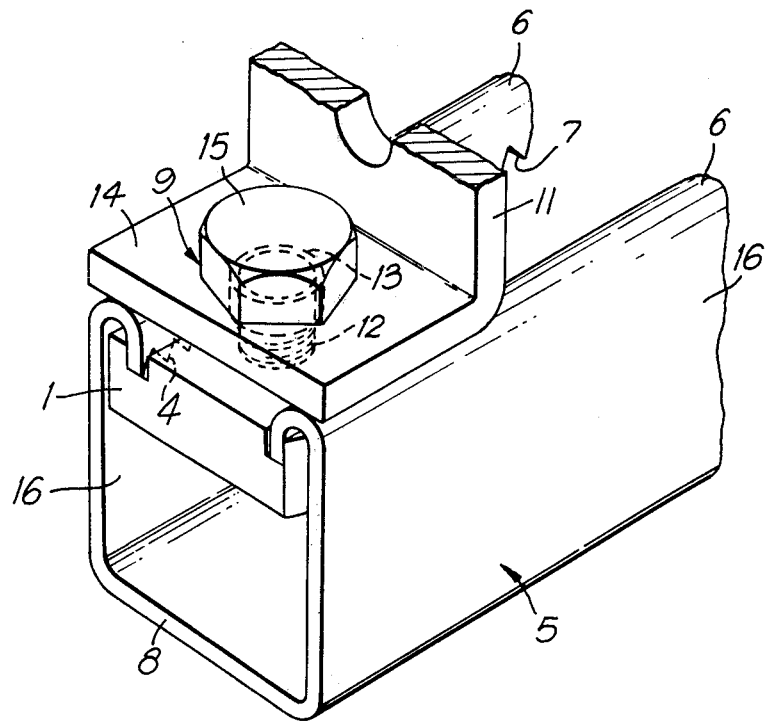
FIG. 7 is a view of a screw fixing in accordance with the invention.

An assembled screw fixing is shown in FIG. 7. The shank 12 of the screw 9 passes through an aperture 13 in a wall 14 of a bracket 11 which is a fitting to be attached to channel 5. The screw head 15 engages the bracket 11. The parallel ribs 4 of the nut 1 interlock with the teeth 7 in the free edges of the flanges 6 of the limbs 16 of the channel.

Although in this example the ribs have an apex of 90°, a wide range of alternative values can be used successfully.

I claim:

1. A screw fixing comprising a device and a channel, said device comprising a fitting having walls defining an aperture; a screw having a screw head and a shank, said shank extending through the aperture in the fitting; and a nut threaded on the shank; the screw head and the nut each having a bearing surface directed towards one another, one of said bearing surfaces having parallel ribs which engage said channel; said channel comprising a base and two limbs, each limb having at its free end an inturned flange directed towards the base of the channel, the flanges defining a slot which is open at both ends, said screw slidably fitting in said slot with one of the nut and screw head within the channel beneath the unturned flanges with its bearing surfaces in contact, at least one of the flanges having spaced formed teeth in its free edge directed towards the base of the channel, said teeth interlocking with said parallel ribs of the bearing surface that engages said channel to prevent said device from sliding longitudinally in the channel.

2. A screw fixing as claimed in claim 1 in which the teeth in the inturned flanges are perpendicular to the major axis of the slot.

3. A screw fixing as claimed in claim 1 or 2 in which the pitch of the ribs is the same as the pitch of the teeth.

4. A screw fixing as claimed in claim 1 or 2 in which the pitch of the ribs is double the pitch of the teeth or another small multiple thereof.

5. A screw fixing as claimed in any one of the preceding claims in which the nut or the screw head, as the case may be, is non-circular so that it can be passed through the slot and rotated to engage the inturned flanges of the channel.

6. A screw fixing as claimed in claim 5 in which the ribs extend approximately parallel to the major dimension of the nut or screw head.

* * * * *